(No Model.) 6 Sheets—Sheet 4.

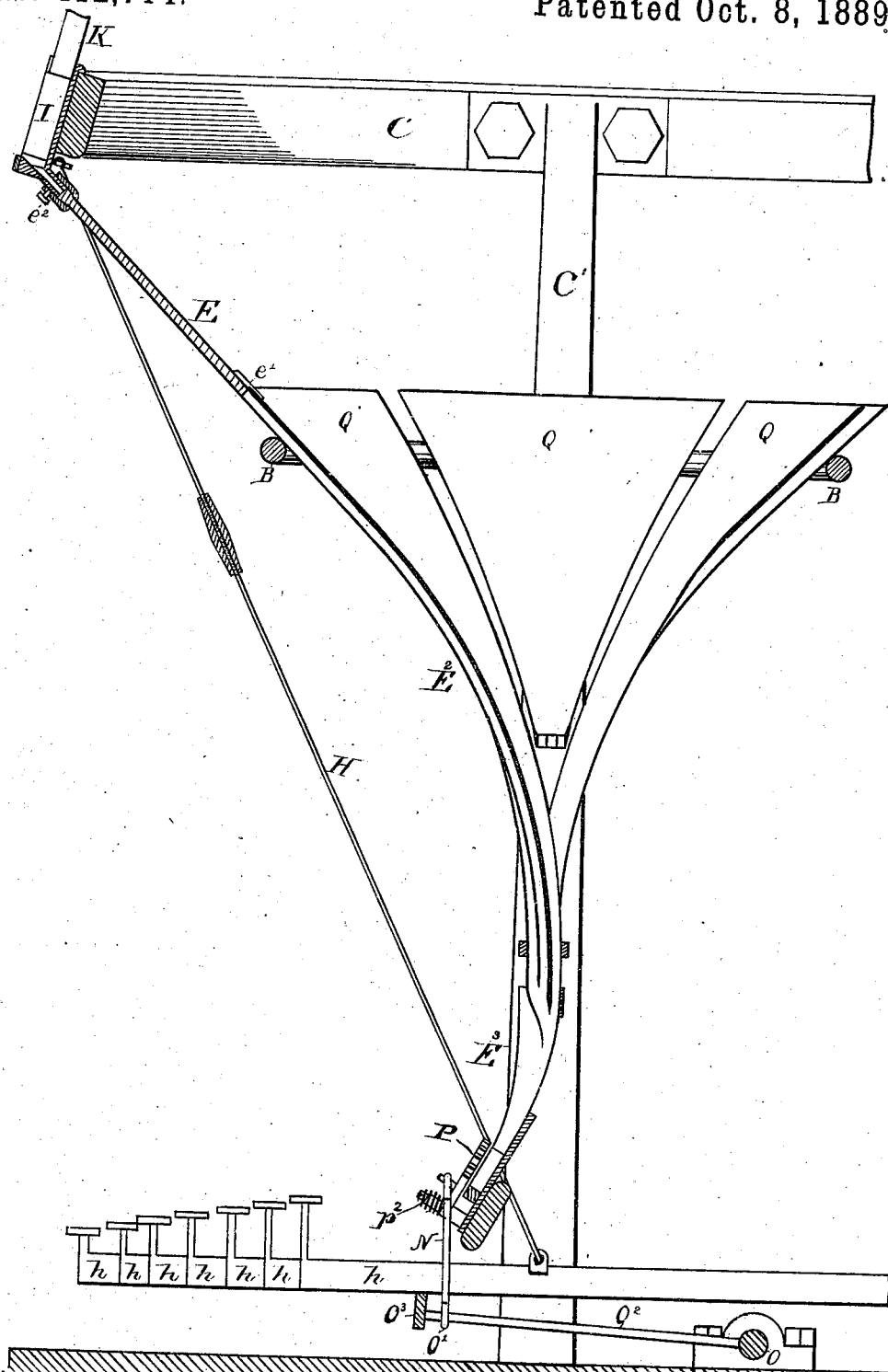

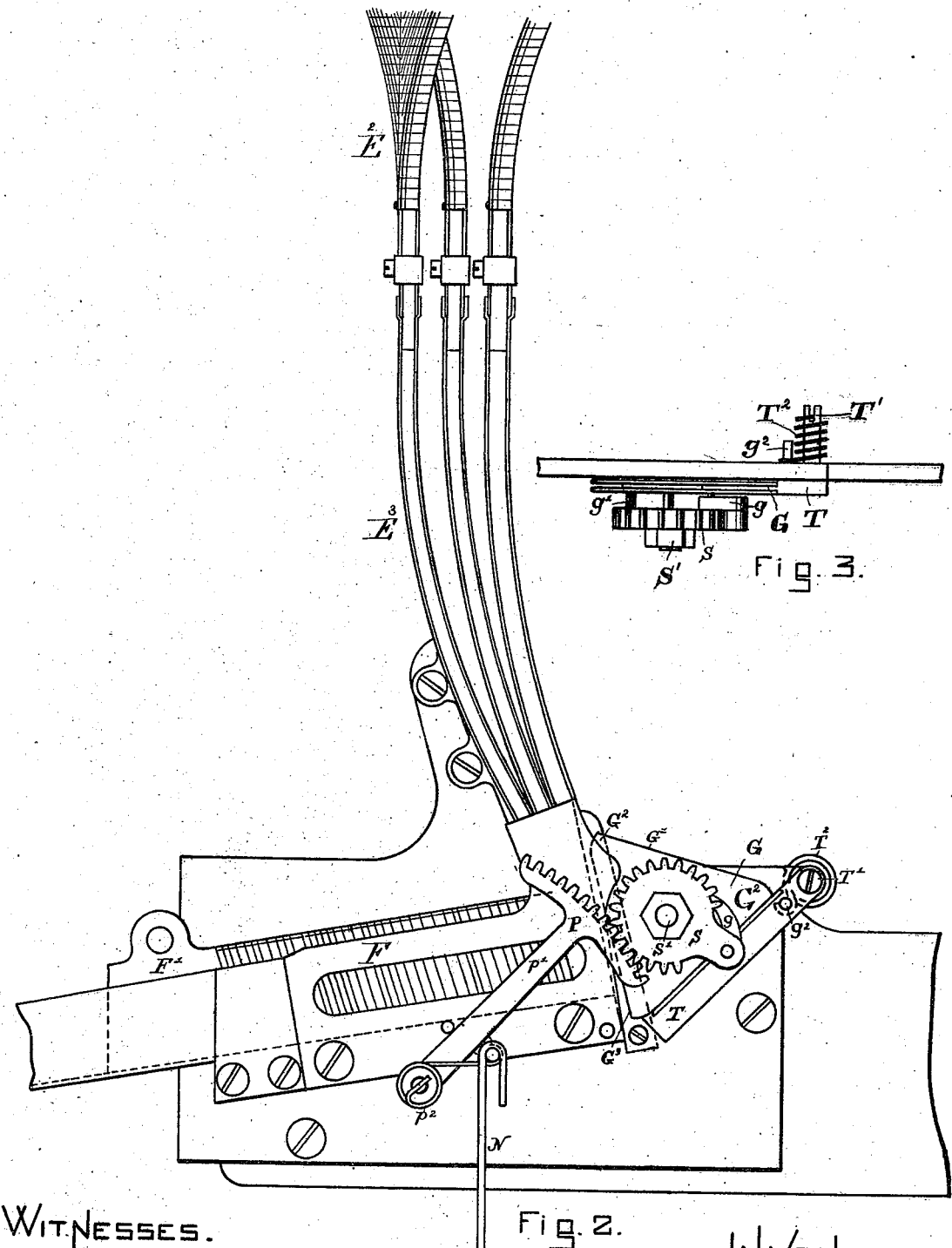

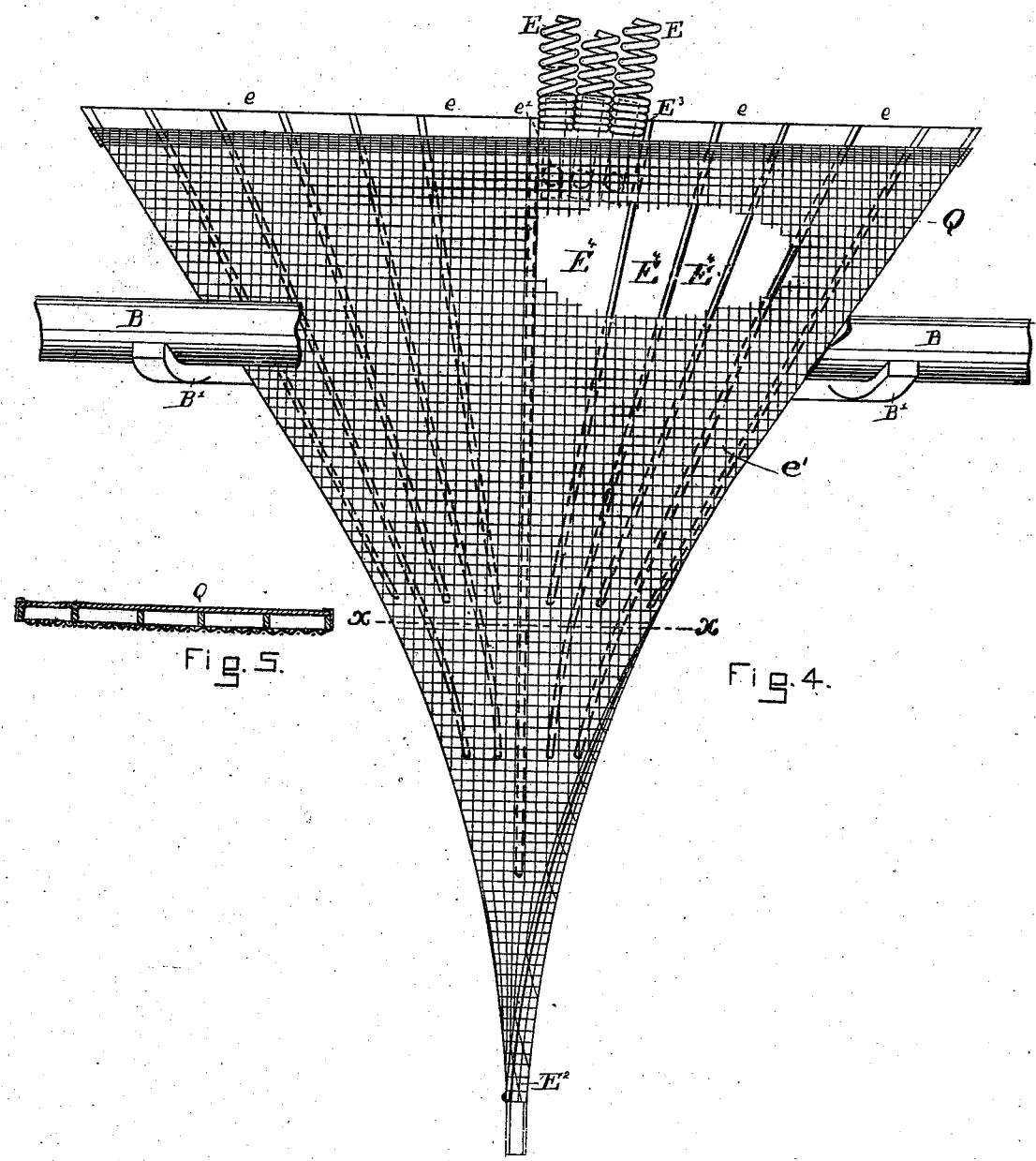

L. DOW.
TYPE SETTING MACHINE.

No. 412,714. Patented Oct. 8, 1889.

Witnesses:
W. L. Bryden
F. G. Fischer

Inventor:
Lorenzo Dow
By his Attorney
L. Deane (No Model.)  6 Sheets—Sheet 5.

L. DOW.
TYPE SETTING MACHINE.

No. 412,714.  Patented Oct. 8, 1889.

WITNESSES.  INVENTOR.

(No Model.) 6 Sheets—Sheet 6.

L. DOW.
TYPE SETTING MACHINE.

No. 412,714. Patented Oct. 8, 1889.

Witnesses
J. Henry Kaiser
Victor J. Evans

Inventor
Lorenzo Dow
By his Attorney
L. Deane

UNITED STATES PATENT OFFICE.

LORENZO DOW, OF BOSTON, MASSACHUSETTS, ASSIGNOR TO THE AMERICAN TYPE SETTER COMPANY, OF PORTLAND, MAINE.

TYPE-SETTING MACHINE.

SPECIFICATION forming part of Letters Patent No. 412,714, dated October 8, 1889.

Application filed December 6, 1886. Serial No. 220,824. (No model.)

*To all whom it may concern:*

Be it known that I, LORENZO DOW, a citizen of the United States, residing at Boston, in the county of Suffolk and State of Massachusetts, have invented certain new and useful Improvements in Type-Setting Machines, of which the following is a specification, reference being had therein to the accompanying drawings.

My invention relates to improvements in type-setting machines using a key-board for setting the type, which, on being released from their respective channels, fall by gravity through converging channels into the stick in the order desired, and particularly it relates to improvements in my machine for which I have already applied for Letters Patent in the United States, November 13, 1885, Serial No. 182,771.

Figure 6:
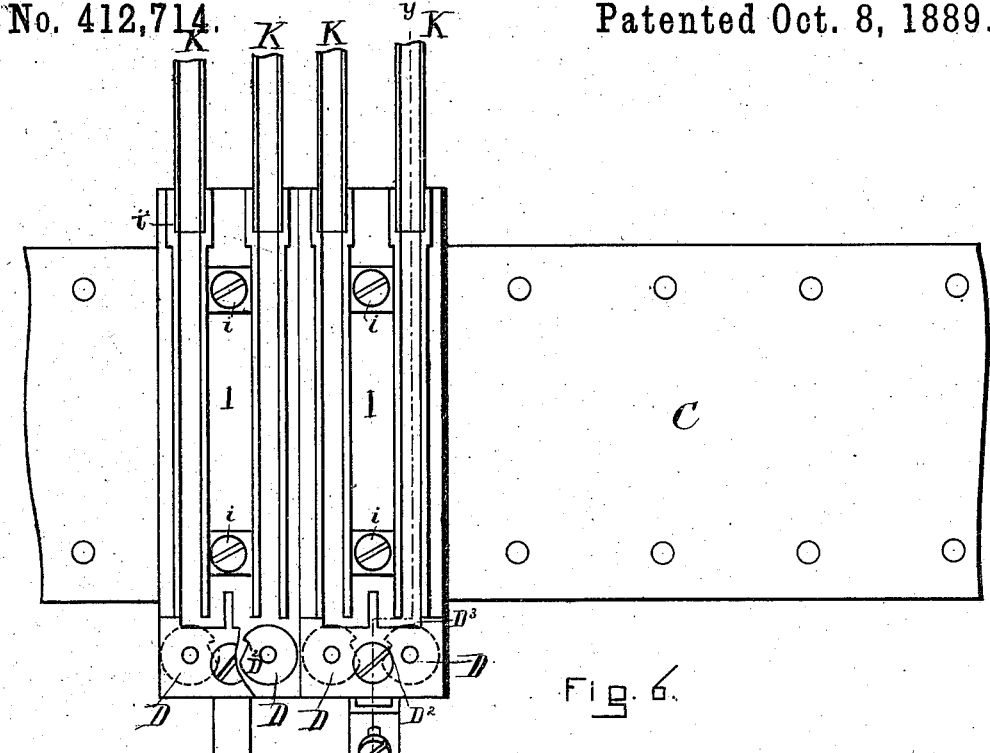
Figure 7:
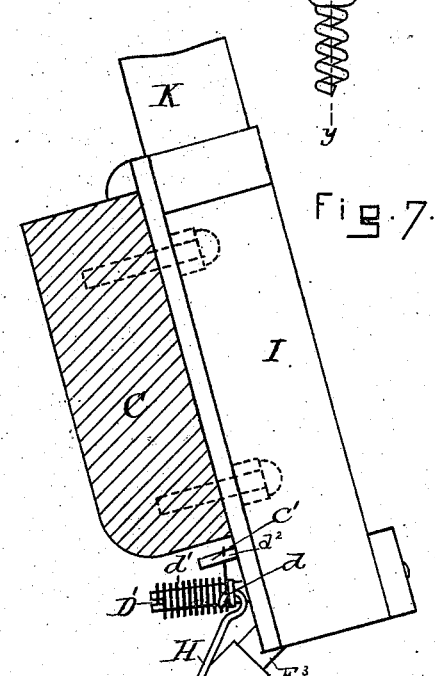
Figure 8:
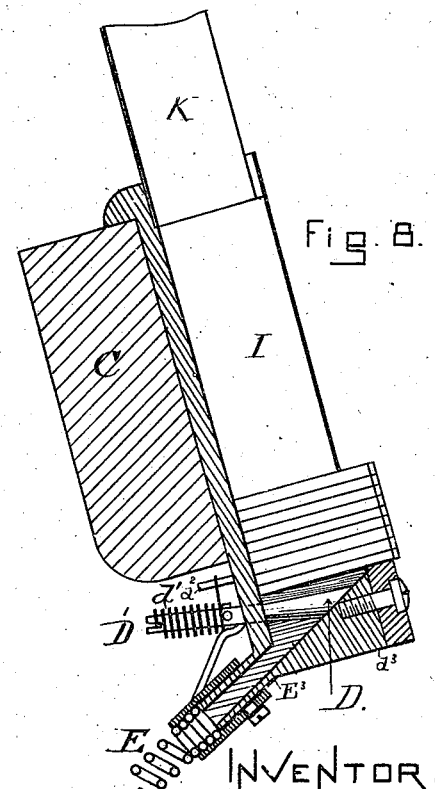
Figure 9:
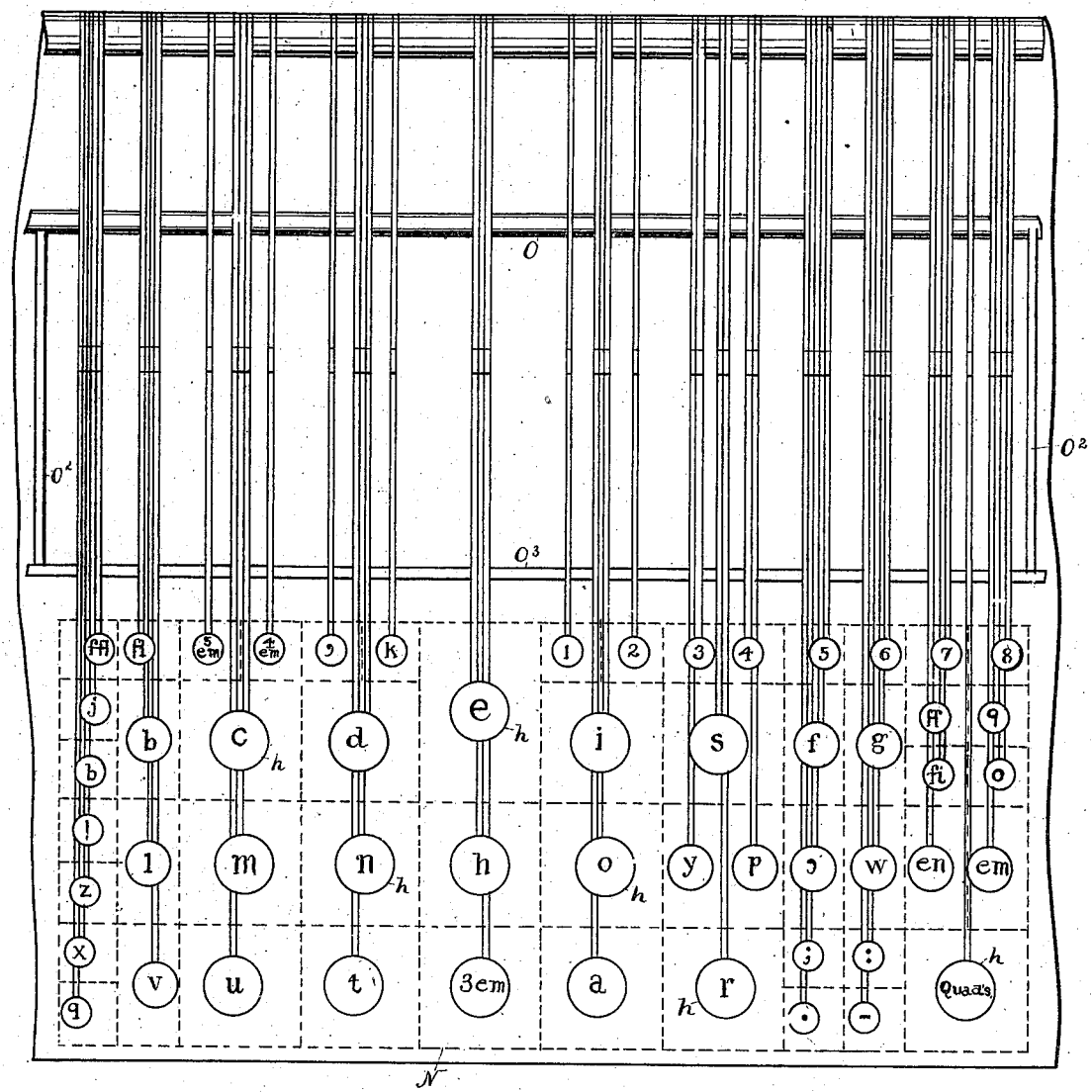
Figure 10:
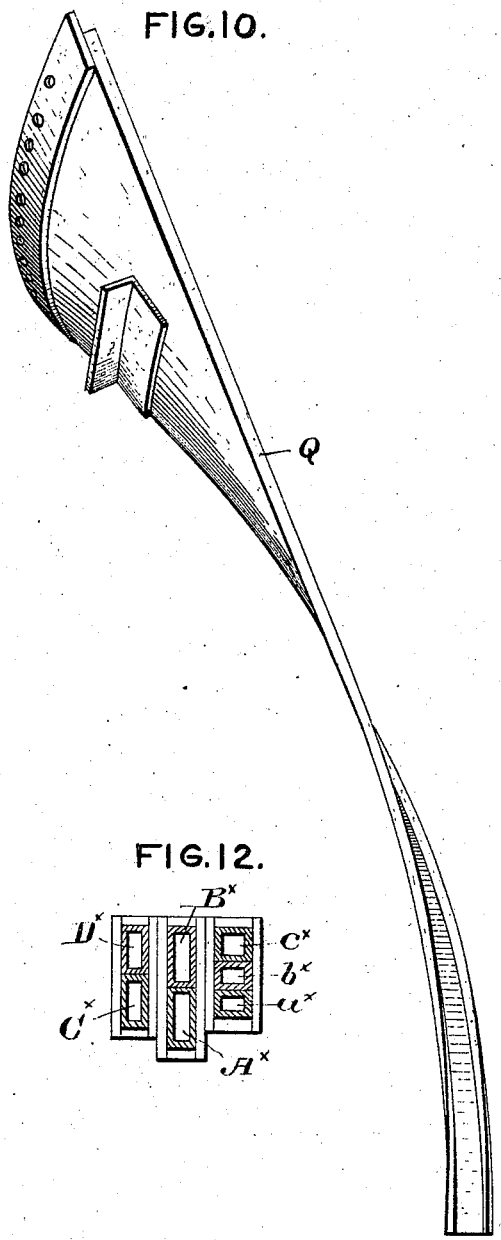
Figure 11:
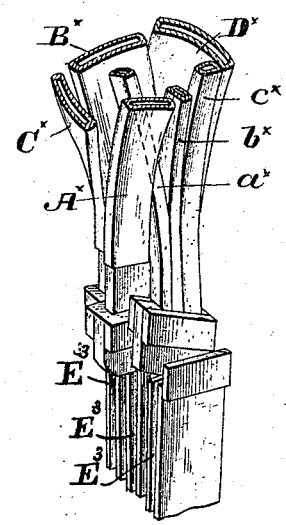
Figure 12:
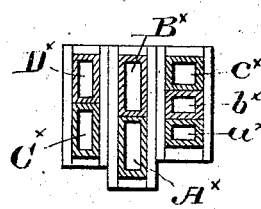
Figure 13:
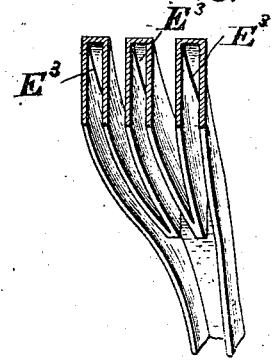

Figure 1 shows a vertical central section of side elevation; Fig. 2, a side view of improved pusher and the lower portion of the converging channels; Fig. 3, a plan of pusher and pusher-gear; Fig. 4, an elevation, in which is shown the lower part of converging channels twisted at the lower portion; Fig. 5, a section of same at $xx$; Fig. 6, a front elevation of portion of the ring with two of the improved channels attached. Fig. 7 is a sectional view of the improved double channel; Fig. 8, a sectional view of improved channel at $yy$ in Fig. 6. Fig. 9 is a plan view of the improved keyboard. Fig. 10 is a perspective view of the twisted plate in Fig. 4, showing more clearly the lines in the same. Fig. 11 is a perspective detail on line 1 1 of 7 9 1, showing the several converging channels into which type fall, feed into seven tubes or passages. Fig. 12 is a plan view on line 2 2 of Fig. 1, showing the tubes into which the type-channel feed. Fig. 13 is a perspective in detail taken on line 3 2 of Fig. 1, showing how the tubes into which the type-channel feed are merged into three and finally into one.

In Fig. 1, C is a part of the improved ring which serves to support the channels I on its outer face, as seen enlarged in Fig. 6. This ring has its supports C' attached at their lower end to the table or stand on which the machine rests. The outer face stands at an angle of about thirty degrees, in order that the type-channels I may stand at this angle to prevent the type therein from falling out forward as they descend.

K is part of a removable channel, which is supported at its lower end by the upper end of the channel I, into which it easily slips, so that the type freely descend through both channels. The upper end of K rests on the periphery of a ring and is kept in place thereon, as shown in the application above referred to. The roller D, Fig. 6, at the bottom of each channel is operated by means of the key-levers, to one of which each of the rollers is connected by rod or wire H. Each roller is longitudinally recessed or grooved, so that when the key is depressed it brings this groove under the column of type into which it drops. On relieving the pressure of the finger on the key the coiled spring $d'$ on the inner end of the roller D rotates said roller about one-third around. By this rotation the lower type is carried out from the column and delivered into the mouth of the tube E. (Seen in Fig. 8.) As shown in Fig. 6, the back or round part of the roller D is presented for the type in the column to rest upon. The depression of the key, as I have said, rotates the roller till the groove or notch is under the column of type and the reaction of the coiled spring carries out the lowermost type. Two channels are made to deliver their type into one tube. By arranging these channels in pairs and making them removable, as was not the case in my former machine, I am able to make them in one casting and very cheaply. They are attached to the ring C by the small screws $ii$. Should they become worn, they are cheaply and readily replaced by new ones.

At $E^x$, Figs. 7 and 8, is seen a short spout or tube, to which the wire tube E is attached, as shown in these figures. The liberated type glides down this short tube into the tube E, and so down to the stick.

Instead of the solid tubes shown in my former application, I find a tube made of coiled wire wound on a mandrel of suitable size and then flattened slightly, so that the type passing down cannot rotate, very good. These tubes are a great improvement over any others with which I am acquainted, since they are easily made, cheap and clean, and always open to inspection. The lower ends of these wire tubes are attached at $e'$ to the plate Q, Fig. 1. This is one of two or more pieces of a somewhat triangular shape, formed to fit the interior of the supporting-ring B. This ring is attached by two arms (not shown here) to the two upright supports C' of the ring C, Fig. 1. These triangular-shaped pieces are made very smooth on the outer surface. On this outer face or surface are wires or rods $e$, riveted to the plate and converging as they descend, so that at the lower end only two type abreast could pass between them, as seen in Fig. 4. These wires are of a diameter a little more than the thickness of the type that passes down between them. Upon these wires or rods a cover $e'$ is riveted, leaving the channels between the plates on one side and the cover on the other. This cover may be made of any suitable material; but I have found a wire-cloth or perforated brass very good, as the type glide down upon these very easily. They are also open and no dirt can accumulate in these channels, and the type are always in view. The coiled-wire tubes E converge at the top of these plates or channels Q, as seen in Fig. 4, and deliver the type they carry between the wires $e$ and between the wire cover $e'$ and the plate Q. As the wires or rods converge, as seen at $E^4$, they bring all the type entering these wire channels E at the top to a single channel at the bottom $E^2$, only wide enough for two type to move abreast. Besides being curved to fit the interior of the ring B, and bent, as in Fig. 1, to cause the type to move in a curve becoming nearly perpendicular at the lower part $E^2$, some of them are also twisted, as seen in Fig. 4, so as to cause all the type to assume the same position in the stick, which they would not otherwise do in machines of a circular figure.

Fig. 5 shows a section at $x$ $x$ of Fig. 4, exhibiting more clearly the construction of these bent, converging, and twisted channels. There are as many of these pieces Q as are necessary to receive all the wire tubes. By using wires or rods $e$ of different sizes, the channels E are made deeper or shallower to adapt them to the sizes of type intended to pass down them. These pieces Q may be formed on a die with the divisions $e$ impressed by it, or they may readily be cast. These pieces Q, having the space divided into channels by the rods $e$ to receive all the type delivered by the wire channels, converge at $E^2$ and deliver their type into channels $E^3$, open in front. These are so bent and curved that the type in falling slide along the back side on their edge, and on the left side of the open channels, Fig. 2, they hug the wall as they pass down. The result of this shape is that the type emerge so accurately in position that they never turn on their side or fail to enter the end of the stick F next to the pusher G.

One of the chief difficulties hitherto encountered in practical type-setting machines has been this propensity of the falling type to assume positions not desired and incompatible with rapid work. The shape I give these lower channels I find sufficient to meet all these difficulties. The type as they arrive in the stick F are not standing on their feet, but resting on their edge. They are speedily brought upright by the twisting of this stick F, which in no wise impedes the movement of the type as they are pushed forward to the justifier.

In Figs. 10, 11, 12, and 13 are illustrated in detail the convergence of the type-channels shown in Fig. 4, so as to feed into a smaller number of tubes or passages $A^\times$, $B^\times$, $C^\times$, $D^\times$, $a^\times$, $b^\times$, and $c^\times$, and again the convergence of these tubes or passages into three $E^3$, $E^3$, and $E^3$, and finally the convergence of these three into one.

The roller D D', in the application of which these claims are improvements, rested normally in such a position that the column of type stood in the groove $d$. In practice I find it did not work so well as to have the column rest on the back or round part of the roller, as seen in Figs. 6 and 8. By this arrangement the bottom type cannot jar out and get out of position, since, resting on the back of the roller, the bottom type is lifted above the opening through which it is to be expelled. As formerly described, by the depression of the key-lever the roller so rotated as to move out the lowermost type. By my present arrangement the depression of a key rotates the roller until the notch or groove therein comes under the column of type, which then drops into it, and on releasing the finger from the key the roller, actuated by the small coiled spring $d'$, returns to its former and normal position, as seen in Fig. 6, carrying out the bottom type into the mouth of the channel, down which it falls. The uniformity of the action of this coiled spring $d'$ causes the type to go out gently, and, no matter how irregularly or violently the key is struck, the type moves with a uniform motion.

In Fig. 2 is shown my improved pusher for advancing the type as they fall in succession along the stick F.

P is the geared sector of a circle actuated, as will be presently explained, by the rod N, which depresses it when any key is depressed, rotating the ratchet $s$, which moves freely on the pin $s'$. Behind this ratchet $s$ is a small toothed wheel $g'$, which is actuated by the pawl $g$, Figs. 2 and 3. This toothed wheel is connected firmly with the triangular piece G, which it moves with it as it is rotated by the pawl $g$.

In Fig. 3 is shown a plan of pusher and pusher-gear. This triangular piece G makes one-third of a complete revolution every time a key of the key-board is depressed, presenting one of its sides, as G', at the end of the channel F. When the operator begins work, the channel F is empty and the movable piece F' is advanced up beneath the channels E³, so that the first type coming down finds itself supported on one side by said piece F', and on the other by the face G' of this triangular rotating piece G. The depression of the key causes the point G² of the piece G to move rapidly, describing the arc of a circle and pushing before it the type and the piece F' in the channel F, and halting at the point G³. The piece T, moving freely on T' and held against the lower face of G, acts as a stop to prevent the further movement of G, thus holding it in the right position to allow the descent of the type and permit them to be advanced by the partial rotation of the piece G. The stop-piece T is held against the face of G' by a small coiled spring T². The rod N is connected at one end with the spring-actuated arm p' of the toothed sector, and at the other with the rocking shaft O at O' in Fig. 1. The depression of any key h depresses this side O² of the rocking frame, and so actuates the pusher. Unless the shaft O has a firm bearing on the table on which the machine rests, and the pieces O² that connect it with O³ lying transversely below the keys h by very rigid rods, it is easy to see that the movement of these levers would not depress O³ an equal distance when they are depressed the same distance.

Fig. 9 is a plan of the central portion of the key-board. It shows the letters of the key-board arranged in the same order as or with little variation from that adopted and used in the printer's case for the lower-case letters. The arrangement of the upper case is to put the large and small caps to the right of the part shown, and the capital and lower-case italics to the left, or vice versa. This arrangement of the keys enables any printer to operate the machine immediately, without the necessity of learning a key-board arranged in any unfamiliar and arbitrary manner. Any printer can operate the machine after a few hours' practice more perfectly than could be done after weeks' practice with a key-board otherwise arranged. Should the machine be made so as to dispense with the italics, the large caps would be arranged on one hand of the lower case shown and the small caps on the other.

I do not limit myself to the exact arrangement in my key-board of the letters in the printer's case, but very nearly so. As I do not use all the spaces used in the printer's case, I am able to put other characters in their place, or use the keys they represent for other purposes; but I would not deviate essentially from the arrangement of the printer's lower case. For the 3-em key, Fig. 9, I use simply the pusher, without attachment to any letter, enabling the operator to advance the type descending after the copy has been all used. As there is a small interval of time between the starting of a type and its arrival in the stick, there may be several on the way which must be advanced as they arrive so as to leave an opening for the next to take its place in front of the pusher G.

In my application filed November 13, 1885, Serial No. 182,771, is shown and claimed a roller in some respects similar to what is embodied in this case, but differing from this in its special combination with the other parts and in its detail of operation.

While the key-board in the present drawings merely shows lower-case letters, it will be obvious that others can be added by the merest mechanical skill.

I claim—

1. In a type-setting machine, the inclined channels I and the converging wire channels, in combination with the rollers D and their springs $d'$, substantially as and for the purpose set forth.

2. In type-setting machines, the coiled-wire tube flattened to receive and convey, without rotating, type of varying size, as and for the purposes described.

3. In type-setting machines, the plates Q, with their converging partitions between the plate and the cover adapted to receive type of varying thicknesses, and bent and twisted, whereby they will deliver the said type in the position desired into the channels E³, as and for the purposes described.

4. In type-setting machines, the pusher G and the geared wheel $g'$ and pawl $g$, in combination with the piece S and its actuating geared sector P, as and for the purposes described.

5. In type-setting machines, the type-channels and type-discharging mechanism, as set forth, in combination with the stick F, the piece F', the pusher G, the rod O³, the sector P, the pinion S, and connections, as set forth, between the sector and pinion and the levers of the key-board, substantially as and for the purposes set forth.

6. In type-setting machines, a key-board with the letters of the lower case arranged substantially as in the printer's case, with the letters of the upper case arranged to the right and left of the same, as and for the purposes described.

7. In a type-setting machine, in combination with the type-channels, in which the type are placed before being set, the longitudinally-grooved rollers D, normally in position to present their rounded sides to the lower ends of the type-channels, the springs connected with each, the key-levers, and the rods connecting them with the rollers, substantially as described, whereby the pressing of a key of the key-board partially rotates said roller, and thereby presents a groove into which said column descends, and which roller, on release of the key under the finger, returns to its former position, carrying out the bottom type, as and for the purposes described.

8. In type-setting machines, the piece T, in combination with the spring T² and the piece G, as and for the purposes mentioned.

9. The type-channel, in combination with the recessed roller normally in position to present its rounded side to the lower end of the type-channel, and with means, substantially as described, for actuating the rollers.

10. In a type-distributing machine, substantially as described, flexible tubes for type-channels, substantially as and for the purpose described.

In testimony whereof I affix my signature in presence of two witnesses.

LORENZO DOW.

Witnesses:
 EUGENE GUELPA,
 CHAS. F. THAYER.